(12) United States Patent
LaVergne et al.

(10) Patent No.: US 11,446,528 B2
(45) Date of Patent: Sep. 20, 2022

(54) FIREWATER MONITOR BRAKE SYSTEM AND METHOD

(71) Applicant: Tyco Fire Products LP, Lansdale, PA (US)

(72) Inventors: Eric LaVergne, Port Arthur, TX (US); James Morgan, Port Arthur, TX (US)

(73) Assignee: Tyco Fire Products LP, Lansdale, PA (US)

( * ) Notice: Subject to any disclaimer, the term of this patent is extended or adjusted under 35 U.S.C. 154(b) by 0 days.

(21) Appl. No.: 17/293,212

(22) PCT Filed: Nov. 12, 2019

(86) PCT No.: PCT/IB2019/059721
§ 371 (c)(1),
(2) Date: May 12, 2021

(87) PCT Pub. No.: WO2020/100044
PCT Pub. Date: May 22, 2020

(65) Prior Publication Data
US 2021/0361990 A1 Nov. 25, 2021

Related U.S. Application Data

(60) Provisional application No. 62/760,675, filed on Nov. 13, 2018.

(51) Int. Cl.
*A62C 31/24* (2006.01)
*A62C 31/28* (2006.01)
(Continued)

(52) U.S. Cl.
CPC .............. *A62C 31/24* (2013.01); *A62C 31/28* (2013.01); *B60T 1/00* (2013.01); *F16L 27/08* (2013.01); *B60T 13/745* (2013.01)

(58) Field of Classification Search
CPC ... B62L 3/08; A62C 3/07; A62C 27/00; A62C 31/02; A62C 31/03; B05B 3/003
(Continued)

(56) References Cited

U.S. PATENT DOCUMENTS 2,998,199 A   8/1961 Miscovich
3,048,976 A   8/1962 Grigsby
(Continued)

FOREIGN PATENT DOCUMENTS

CN   101569782 A   11/2009
CN   201921365 U   8/2011

OTHER PUBLICATIONS

International Search Report and Written Opinion on International Application No. PCT/IB2019/059721, dated Feb. 21, 2020, 14 pages.

*Primary Examiner* — Bradley T King
(74) *Attorney, Agent, or Firm* — Foley & Lardner LLP

(57) ABSTRACT

System and method relates to a firewater monitor brake system, comprising a vertical locking disc collar adapted to be affixed externally or internally to a horizontal swivel of a firewater monitor system; a horizontal locking disc collar adapted to be affixed externally or internally to a vertical swivel of the firewater monitor system; a vertical brake mount adapted to be affixed to a horizontal swivel mounting pad of the firewater monitor system; a horizontal brake mount adapted to be affixed to a vertical swivel mounting pad of the firewater monitor system; a vertical brake system; wherein the vertical brake system is affixed to the vertical brake mount such that a portion of the vertical brake system is disposed around a portion of the vertical locking disc collar; a horizontal brake system, wherein the horizontal brake system is affixed to the horizontal brake mount such that a portion of the horizontal brake system is disposed around a portion of the horizontal locking disc collar; and a (Continued)

master cylinder adapted to be affixed to a tiller bar of the firewater monitor system, wherein the master cylinder is connected to and/or coupled to a lever system and wherein the master cylinder is connected to and or coupled to the vertical brake system and/or the horizontal brake system via an actuation system. Methods for making and using the system are also disclosed.

9 Claims, 20 Drawing Sheets

(51) Int. Cl.
  *F16L 27/08* (2006.01)
  *B60T 1/00* (2006.01)
  *B60T 13/74* (2006.01)
(58) Field of Classification Search
  USPC ........................................ 169/27; 188/24.16
  See application file for complete search history.

(56) References Cited

U.S. PATENT DOCUMENTS

| | | | |
|---|---|---|---|
| 3,950,948 A | 4/1976 | Luke | |
| 4,506,738 A | 3/1985 | Evans et al. | |
| 4,793,557 A | 12/1988 | Marchese et al. | |
| 5,593,092 A | 1/1997 | McMillan et al. | |
| 6,305,621 B1 * | 10/2001 | Kolacz | F16L 27/08 |
| | | | 239/587.2 |
| 6,655,613 B1 * | 12/2003 | Brown | B05B 15/652 |
| | | | 239/587.1 |
| 7,644,777 B2 * | 1/2010 | Combs | B05B 15/65 |
| | | | 169/52 |
| 9,557,199 B2 * | 1/2017 | Combs | A62C 37/50 |
| 10,780,304 B1 * | 9/2020 | Moore | F03B 15/20 |
| 2004/0051312 A1 | 3/2004 | Haviland | |
| 2010/0051394 A1 * | 3/2010 | Tsai | B62L 3/08 |
| | | | 188/72.5 |
| 2019/0023347 A1 * | 1/2019 | Block | B62L 3/08 |

* cited by examiner

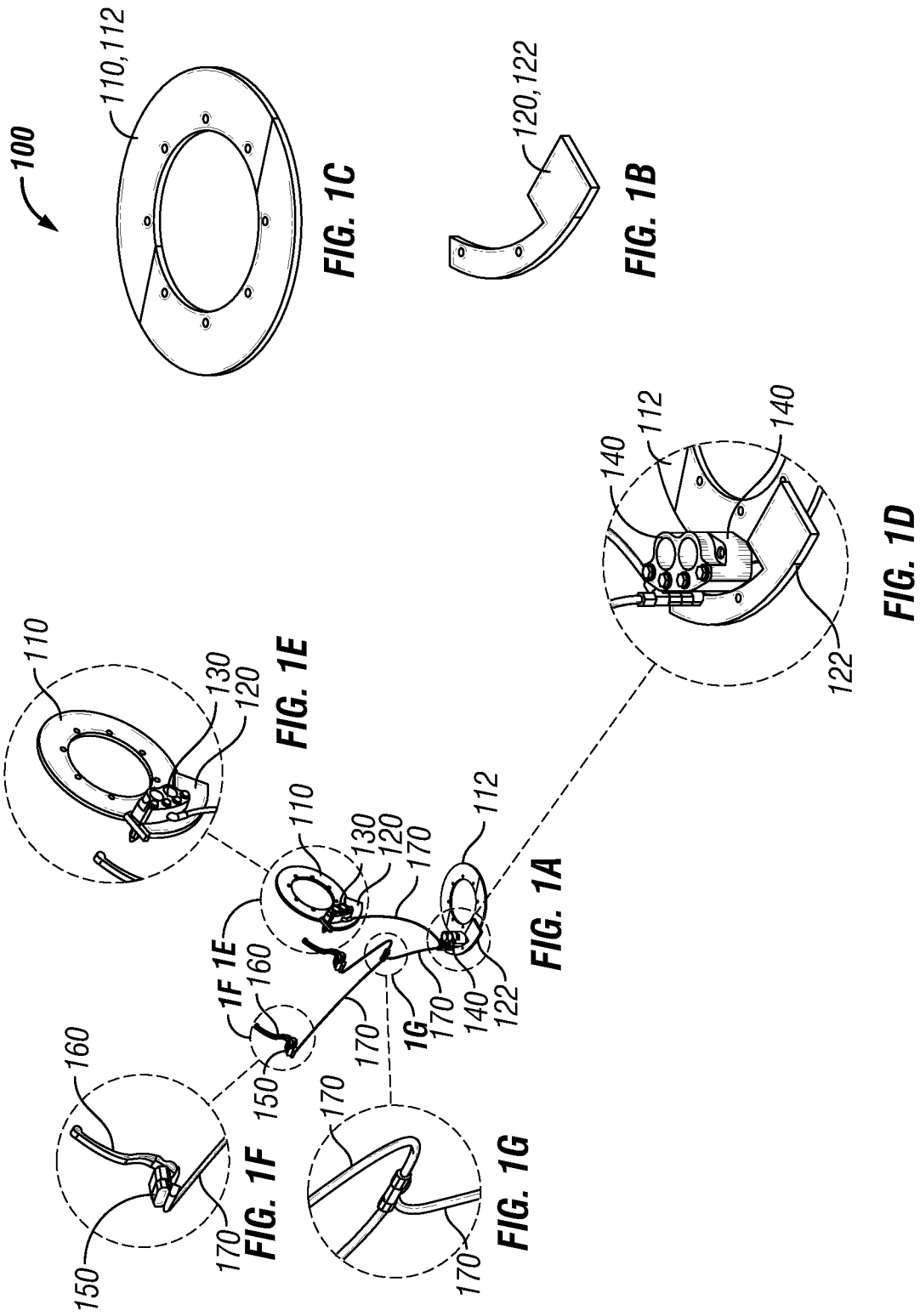

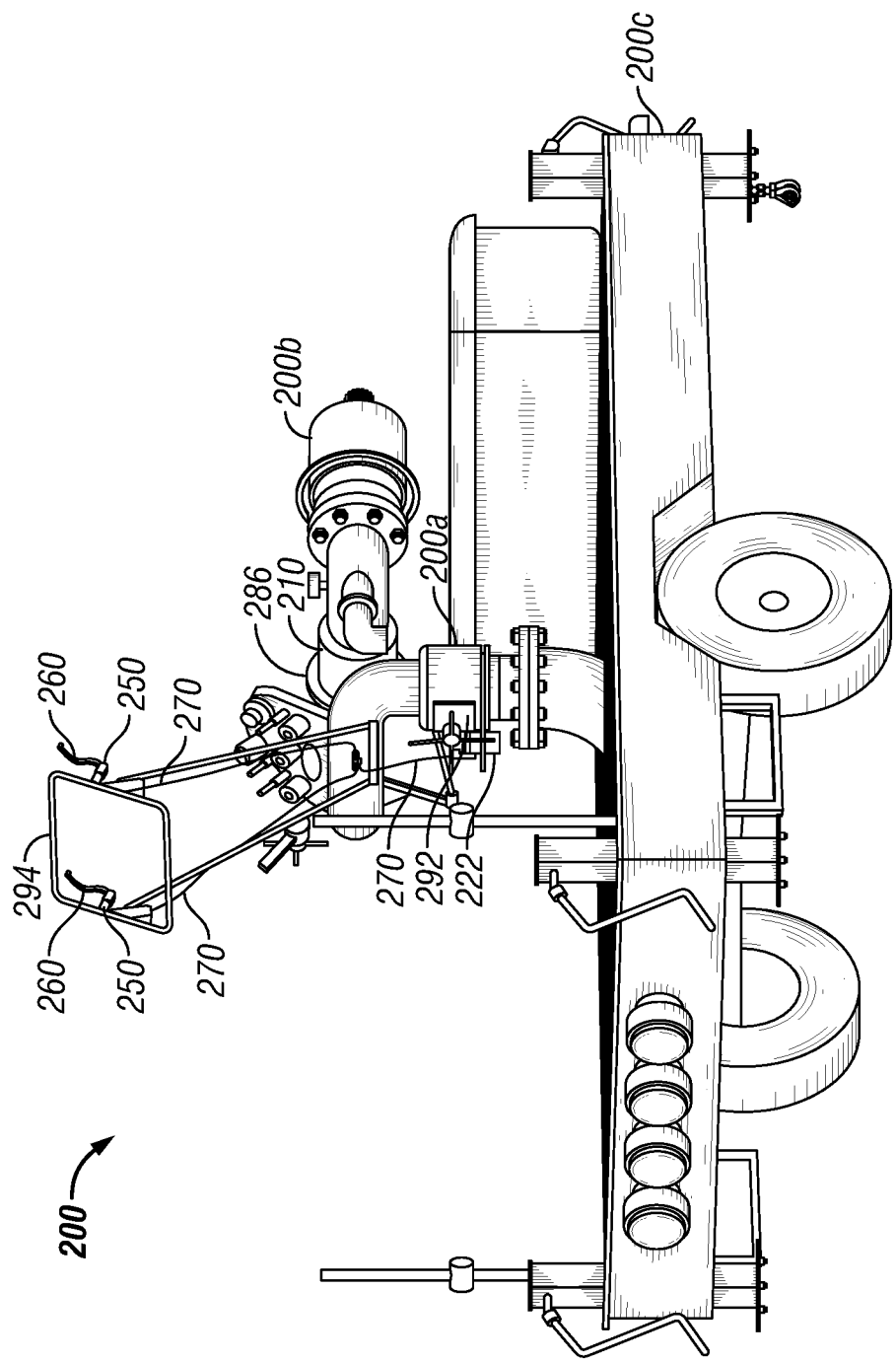

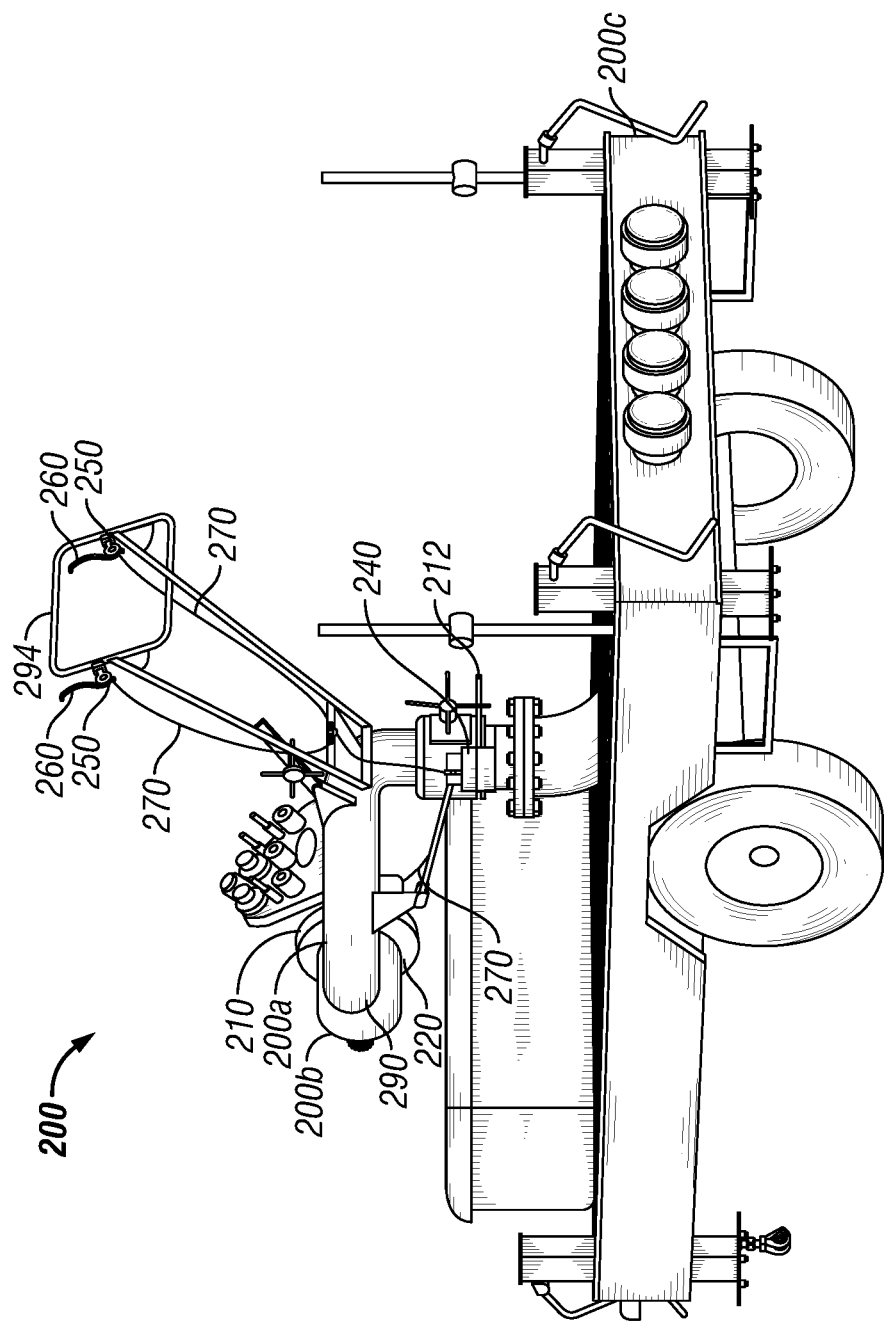

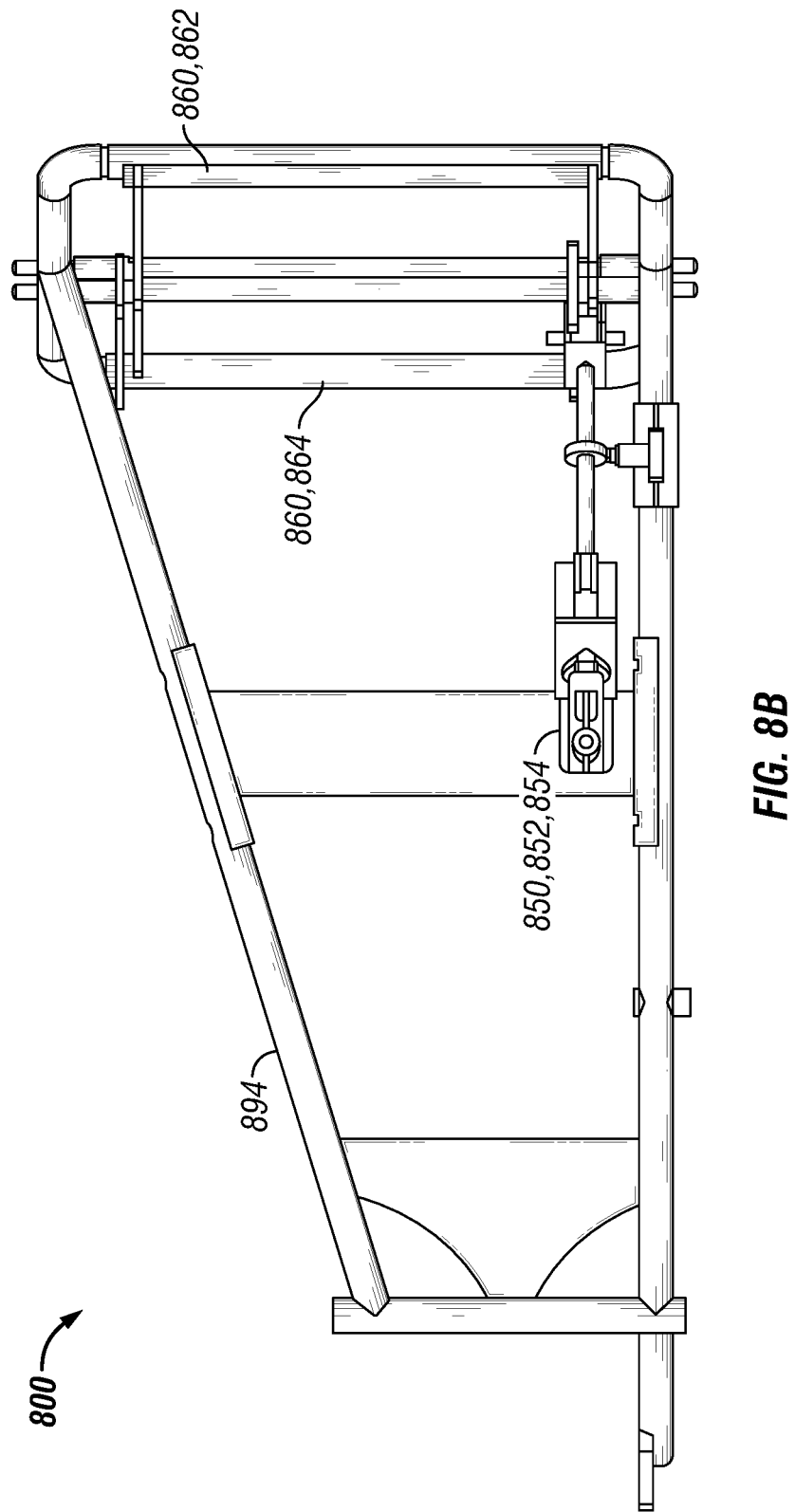

ND METHOD

PRIOR RELATED APPLICATIONS

This application is a U.S. National Phase Entry Patent Application of PCT International Patent Application Serial No. PCT/IB2019/059721, filed on Nov. 12, 2019, which claims priority to and the benefit of U.S. Provisional Patent Application Ser. No. 62/760,675, entitled "FIREWATER MONITOR BRAKE SYSTEM AND METHOD," filed on Nov. 13, 2018, which is incorporated by reference herein.

BACKGROUND OF INVENTION

The present disclosure relates generally to fire water monitors. More specifically, the present disclosure relates a firewater monitor brake system and method.

Firewater monitors range in size—flowing from hundreds to tens of thousands of gallons of water flow per minute. Firewater monitors offer motive water flow to a nozzle affixed to the monitor tip for delivering water and/or extinguishing agents as a mitigating factor onto an airborne hazard and/or fire.

Monitor designs include both manually-operated and motor-actuated configurations.

Motor-actuated monitors are controlled by protected electric, hydraulic or pneumatic-actuated gear mechanisms that produce vertical and horizontal travel, determining positon while also limiting free movement of the monitor along its course of travel.

Manually-operated monitors may also include gear mechanisms for controlling monitor travel, where gears are manipulated manually by hand by an operator. Pace of movement along both horizontal and vertical axes for gear-operated monitors is limited by the mechanical ratio of the controlling gears.

In lieu of gears, manually-operated monitors may also include a tiller bar design-a single point of contact with the monitor either by one controller bar or lever, or by a dual, handle-bar style controller used by an operator to control monitor movement more freely along both vertical and horizontal axes. This monitor design allows for more rapid, free movement along both axes and commonly relies on manual locking mechanisms to fix and to secure the monitor positon—one lock for vertical travel and a second lock for horizontal travel. This tiller-bar styled monitor offers the benefit of rapid monitor movement by the operator. In fire response, this rapid response capability is preferred in a manned response effort to assure prompt critical life safety controls against what is commonly an ever changing threat.

While tiller bar control over the fire monitor is quicker and more responsive, as monitor size and flow rates increase, the monitor becomes more difficult to control with manual monitor brake systems. An automated, fail-safe monitor brake system that is more ergonomic and easy to use would be ideal, particularly, for larger monitors with higher flow rates.

Therefore, there is a need for an automatic firewater monitor brake system and method.

SUMMARY

The firewater monitor brake system and method of the present invention offers an automated, fail-safe safety mechanism that locks the position of a manually-operated monitor in the event of loss of control by the operator.

Mechanical in nature, the firewater monitor brake system may comprise one or more brake system, each activated and deactivated by one or more lever system, which opens or closes each brake system around a "locking disc" collar. One locking disc collar may be affixed externally around a circumference (i.e., circular cross section) or an outer surface (e.g., elliptical cross section) of a horizontal waterway of a firewater monitor system; and another locking disc collar may be affixed externally around a circumference (i.e., circular cross section) or an outer surface (e.g., elliptical cross section) of a vertical waterway of the firewater monitor system.

Alternatively, when the monitor uses a first slewing drive for the horizontal waterway and a second slewing drive for the vertical water way, one locking disc collar may be affixed internally around an inner circumference (i.e., circular cross section) or an inner surface (e.g., elliptical cross section) of a horizontal waterway of a firewater monitor system; and another locking disc collar may be affixed internally around an inner circumference (i.e., circular cross section) or an inner surface (e.g., elliptical cross section) of a vertical waterway of the firewater monitor system.

Each brake system has an open and a closed position. The closed or "actuated" position of the brake system is its "resting state," which clamps the locking disc collar with sufficient energy as to prohibit rotational movement of the monitor waterway around its particular axis. When the brake system is "deactivated" to its open position by depressing the lever system, the brake system releases the locking disc collar allowing free movement of the monitor waterway around is particular axis. Again, intentional or accidental release of one or more lever system actuates the brake system, thereby, clamping down on one or more locking discs collars to stop/lock the firewater monitor system's position and prevent further travel in either the horizontal and/or vertical direction.

Operation of the firewater monitor brake system may be integrated into the firewater monitor system's handle-bar styled controller as an ergonomic accessory lever system that will simultaneously activate and deactivate one or more brake systems. While gripping the firewater monitor system's handle bar for normal operation, this lever system may be depressed naturally, thereby, deactivating one or more brake system to its open position, which allows controlled monitor movement by the operator. When one or more lever system is released—either intentionally or accidently—the one or more brake system activates to a closed position immediately stopping/locking the firewater monitor system's position and preventing further travel in either the horizontal and/or vertical direction.

At least one embodiment relates to a firewater monitor brake system comprises: a vertical locking disc collar adapted to be affixed externally or internally to a horizontal swivel of a firewater monitor system; a horizontal locking disc collar adapted to be affixed externally or internally to a vertical swivel of the firewater monitor system; a vertical brake mount adapted to be affixed to a horizontal swivel mounting pad of the firewater monitor system; a horizontal brake mount adapted to be affixed to a vertical swivel mounting pad of the firewater monitor system; a vertical brake system; wherein the vertical brake system is affixed to the vertical brake mount such that a portion of the vertical brake system is disposed around a portion of the vertical locking disc collar; a horizontal brake system, wherein the horizontal brake system is affixed to the horizontal brake mount such that a portion of the horizontal brake system is disposed around a portion of the horizontal locking disc collar; and a master cylinder adapted to be affixed to a tiller bar of the firewater monitor system, wherein the master cylinder is connected to and/or coupled to a lever system and wherein the master cylinder is connected to and or coupled to the vertical brake system and/or the horizontal brake system via an actuation system.

In an embodiment, the vertical brake system is selected from the group consisting of a plate-on-plate brake system, a meshed-teeth brake system, a retracting, locking pin brake system and combinations thereof. In an embodiment, the horizontal brake system is selected from the group consisting of a plate-on-plate brake system, a meshed-teeth brake system, a retracting, locking pin brake system and combinations thereof. In an embodiment, one or more of the vertical brake system and the horizontal brake system is a caliper brake system. In an embodiment, one or more of the vertical brake system and the horizontal brake system is a disc brake system. In an embodiment, one or more of the vertical brake system and the horizontal brake system is a meshed-teeth braking system. In an embodiment, one or more of the vertical brake system and the horizontal brake system is a retracting, locking pin brake system.

In an embodiment, one or more of the vertical brake system and the horizontal brake system is capable of an activated, closed position, clamping the vertical locking disc collar and/or the horizontal locking collar with sufficient energy to prevent rotational movement of a horizontal waterway and/or a vertical waterway of the firewater monitor system. In an embodiment, one or more of the vertical brake system and the horizontal brake system is capable of a deactivated, open position, releasing the vertical locking disc collar and/or the horizontal locking collar to allow rotational movement of a horizontal waterway and/or a vertical waterway of the firewater monitor system.

In an embodiment, the master cylinder is a hydraulic master cylinder or radial master cylinder. In an embodiment, the master cylinder is a hydraulic master cylinder. In an embodiment, the master cylinder is a radial master cylinder.

In an embodiment, the lever system may be hand or foot operated. In an embodiment, the lever system is hand operated. In an embodiment, the lever system is foot operated.

In an embodiment, the lever system is selected of the group consisting of a caliper-style lever system, a side-to-side handle-style lever system, a top-to-bottom-style lever system and combinations thereof. In an embodiment, the lever system is a caliper-style lever system. In an embodiment, the lever system is a side-to-side handle-style (e.g., lawn mower lever) lever system. In an embodiment, the lever system is a top-to-bottom handle-style lever system.

In an embodiment, the lever system is selected from the group consisting of a button-style (e.g., anchor windlass) lever system, a pedal-style (e.g., sewing machine pedal) lever system and combinations thereof.

In an embodiment, the actuation system is selected from the group of cable-linkage systems, hydraulic systems, pneumatic systems and combinations thereof. In an embodiment, the actuation system is a cable-linkage system. In an embodiment, the actuation system is a hydraulic system. In an embodiment, the actuation system is a pneumatic system.

Another embodiment relates to a method of using the firewater monitor brake system comprises: providing the firewater monitor brake system, as discussed herein; and depressing one or more lever to deactivate the vertical brake and/or the horizontal brake.

In an embodiment, the method further comprises: releasing one or more lever to activate the vertical brake and/or the horizontal brake.

In an embodiment, the method comprises: depressing a vertical lever to deactivate the vertical brake. In an embodiment, the method further comprises: releasing the vertical lever to activate the vertical brake.

In an embodiment, the method comprises depressing a horizontal lever to deactivate the horizontal brake. In an embodiment, the method further comprises: releasing a horizontal lever to activate the horizontal brake.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

These and other objects, features and advantages will become apparent as reference is made to the following detailed description, preferred embodiments, and examples, given for the purpose of disclosure, and taken in conjunction with the accompanying drawings and appended claims.

BRIEF DESCRIPTION OF THE FIGURES

For a further understanding of the nature and objects of the present invention, reference should be made to the following detailed disclosure, taken in conjunction with the accompanying drawings, in which like parts are given like reference numerals, and wherein:

FIG. 1A is a rear, upper perspective view of an exemplary firewater monitor brake system according to an embodiment of the present invention;

FIG. 1B is a detail view of an exemplary brake mount system for the firewater monitor brake system of FIG. 1A;

FIG. 1C is a detail view of an exemplary locking disc collar for the firewater monitor brake of FIGS. 1A-1B;

FIG. 1D is a detail view of an exemplary horizontal brake system, exemplary horizontal brake mount and an exemplary horizontal locking disc collar for the firewater monitor brake system of FIGS. 1A-1C;

FIG. 1E is a detail view of an exemplary vertical brake system, an exemplary vertical brake mount and an exemplary vertical locking disc collar for the firewater monitor brake system of FIGS. 1A-1D;

FIG. 1F is a detail view of an exemplary lever system for the firewater monitor brake system of FIGS. 1A-1E;

FIG. 1G is detail view of an exemplary actuation system for the firewater monitor brake system of FIG. 1A;

FIG. 2B is a rear, right perspective view of the firewater monitor brake system of FIG. 2A;

FIG. 2C is a rear, left perspective view of the firewater monitor brake system of FIGS. 2A-2B;

FIG. 8B is a top view of the exemplary lever system of FIGS. 7A-7C and 8A, showing the lever system in the engaged position;

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains. Therefore, the scope of the present invention is defined only by the appended claims, along with the full scope of equivalents to which such claims are entitled.

Firewater Monitor Brake System

Figure 1H:
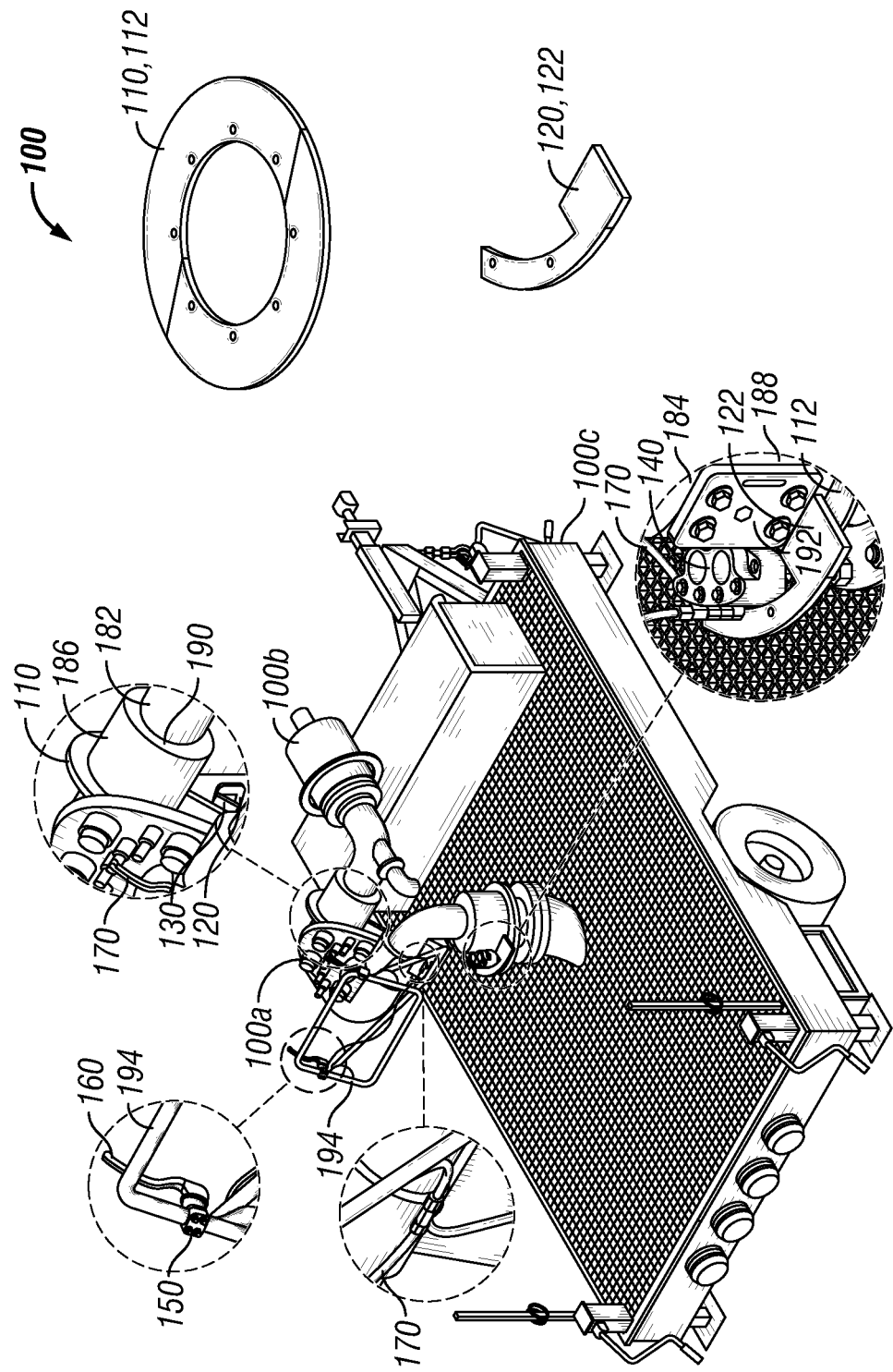
FIG. 1H is a rear, upper perspective view of the firewater monitor brake system of FIGS. 1A-1F installed on an exemplary firewater monitor, nozzle and trailer system according to an embodiment of the present invention.
Figure 2A:
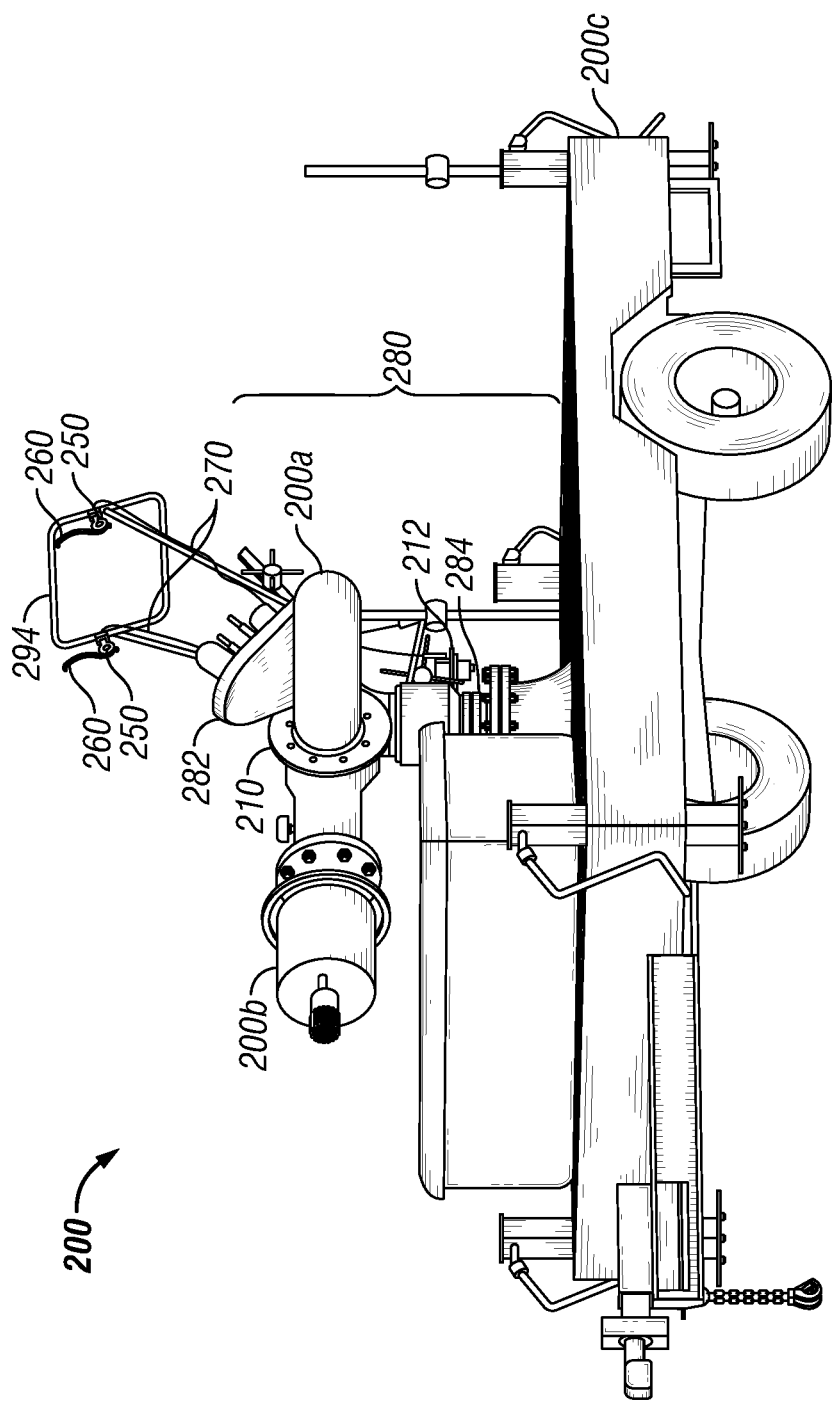
FIG. 2A is a front, left perspective view of a firewater monitor brake system installed on an exemplary firewater monitor, nozzle and trailer system according to an embodiment of the present invention.
Figure 2D:
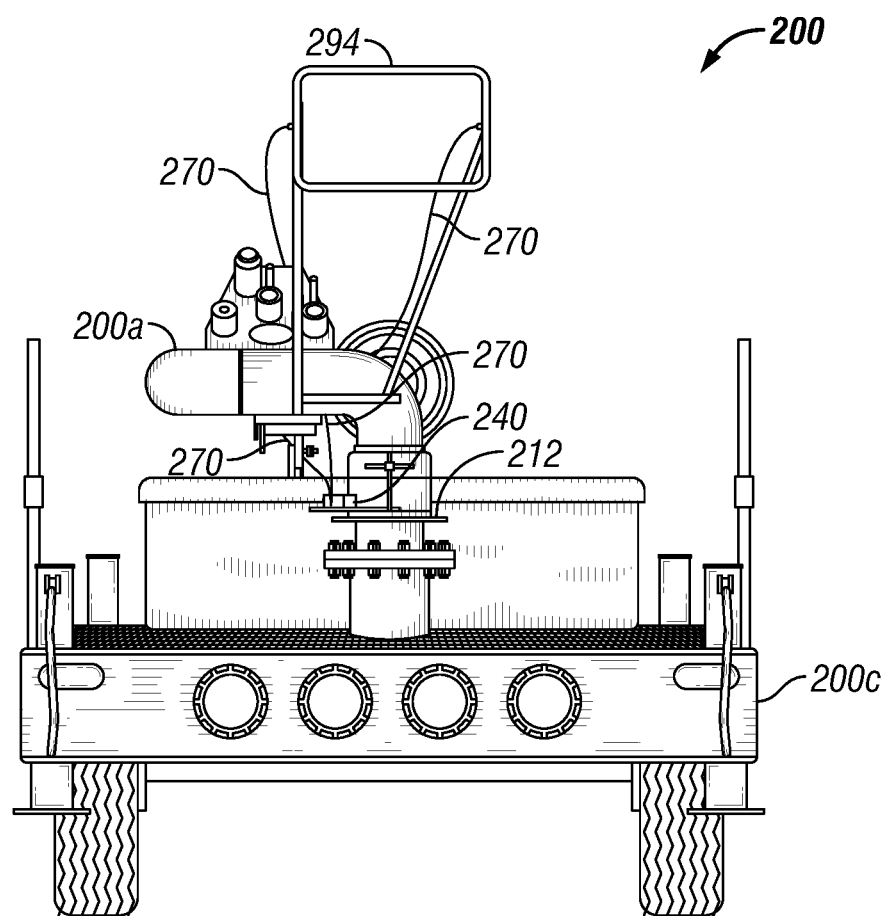
FIG. 2D is a rear view of the firewater monitor brake system of FIGS. 2A-2C.
Figure 2E:
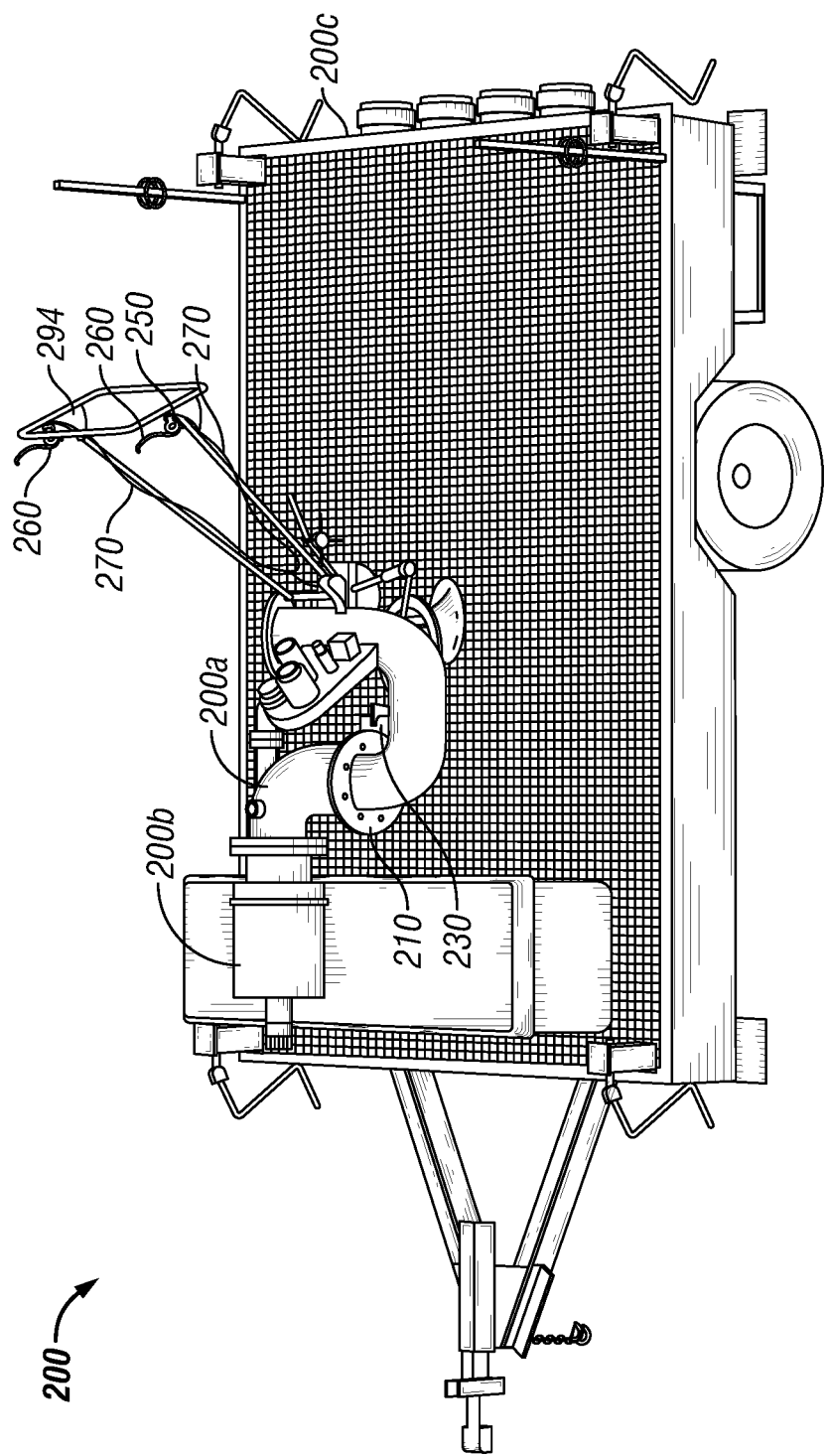
FIG. 2E is an upper, left perspective view of the firewater monitor brake system of FIGS. 2A-2D.
Figure 2F:
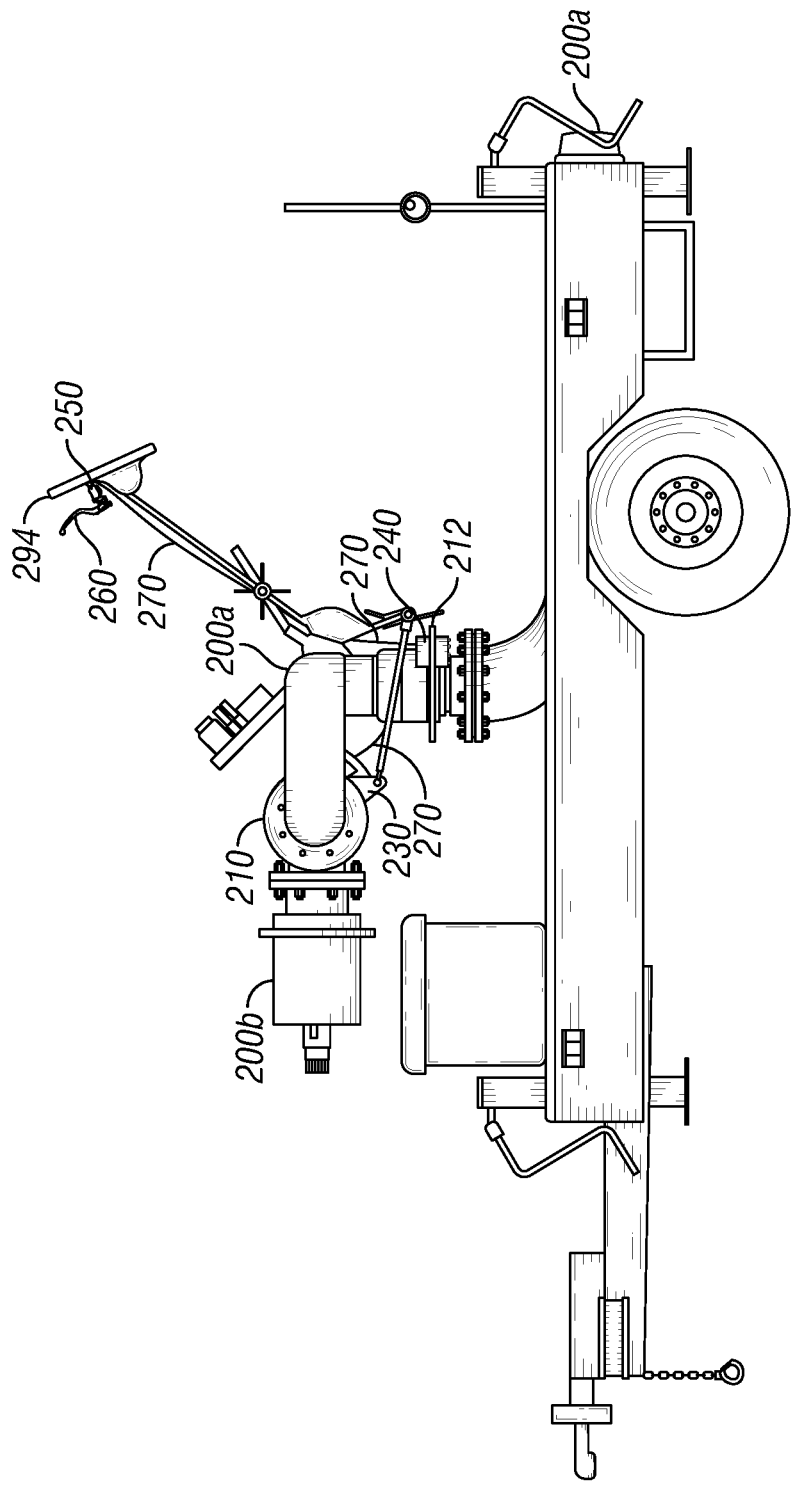
FIG. 2F is a left, side view of the firewater monitor brake system of FIGS. 2A-2E.

FIG. 1A illustrates a rear, upper perspective view of a firewater monitor brake system 100 according to an embodiment of the present invention; FIG. 1B illustrates a detail view of an exemplary brake mount 120, 122 for the firewater monitor brake system 100 of FIG. 1A; FIG. 1C illustrates a detail view of an exemplary locking disc collar 110, 112 for the firewater monitor brake system 100 of FIGS. 1A-1B; FIG. 1D illustrates a detail view of an exemplary horizontal brake system 140, exemplary horizontal brake mount 122 and an exemplary horizontal locking disc collar 112 for the firewater monitor brake system 100 of FIGS. 1A-1C; FIG. 1E illustrates a detail view of an exemplary vertical brake system 130, an exemplary vertical brake mount 120 and an exemplary vertical locking disc collar 110 for the firewater monitor brake system 100 of FIGS. 1A-1D; FIG. 1F illustrates a detail view of an exemplary lever system 160 for the firewater monitor brake system 100 of FIGS. 1A-1E; FIG. 1G illustrates detail view of an exemplary actuation system 170 for the firewater monitor brake system 100 of FIG. 1A; and FIG. 1H illustrates a rear, upper perspective view of the firewater monitor brake system 100 of FIGS. 1A-1F installed on an exemplary firewater monitor 100a, nozzle 100b and trailer 100c system according to an embodiment of the present invention;

FIG. 2A illustrates a front, left perspective view of a firewater monitor brake system 200 installed on an exemplary firewater monitor 200a, nozzle 200b and trailer 200c system according to an embodiment of the present invention; FIG. 2B illustrates a rear, right perspective view of the firewater monitor brake system 200 of FIG. 2A; FIG. 2C illustrates a rear, left perspective view of the firewater monitor brake system 200 of FIGS. 2A-2B; FIG. 2D illustrates a rear view of the firewater monitor brake system 200 of FIGS. 2A-2C; FIG. 2E illustrates an upper, left perspective view of the firewater monitor brake system 200 of FIGS. 2A-2D; and FIG. 2F illustrates a left, side view of the firewater monitor brake system 200 of FIGS. 2A-2E.

As shown in FIGS. 1A-1H and FIGS. 2A-2F, the firewater monitor brake system 100, 200 comprises a vertical locking disc collar 110, 210, a horizontal locking disc collar 112, 212, a vertical brake mount 120, 220, a horizontal brake mount 122, 222, a vertical brake system 130, 230, a horizontal brake system 140, 240, a master cylinder 150, 250, 750, 850, a lever system 160, 260, 760, 860, 960 and an actuation system 170, 270, 970. See also FIGS. 7A-9.

Locking Disc Collars

The vertical disc locking collar 110, 210 may be any suitable shape and size. A suitable vertical disc locking collar 110, 210 may be shaped and sized to fit externally around a circumference (i.e., circular cross section) or an outer surface (e.g., elliptical cross section) of a horizontal waterway 182, 282 of a firewater monitor system 180, 280. In an embodiment, the vertical disc locking collar 110, 210 may be ring-shaped.

Alternatively, when the monitor uses a first slewing drive for the horizontal waterway, a suitable vertical disc locking collar 110, 210 may be shaped and sized to fit internally around an inner circumference (i.e., circular cross section) or an inner surface (e.g., elliptical cross section) of the horizontal waterway 182, 282 of a firewater monitor system 180, 280. In an embodiment, the vertical disc locking collar 110, 210 may be ring-shaped.

The horizontal disc locking collar 112, 212 may be any suitable shape and size. A suitable horizontal disc locking collar 112, 212 may be shaped and sized to fit externally around a circumference (i.e., circular cross section) or an outer surface (e.g., elliptical cross section) of a vertical waterway 184, 284 of the firewater monitor system 180, 280. In an embodiment, the horizontal disc locking collar 112, 212 may be ring-shaped.

Alternatively, when the monitor uses a second slewing drive for the vertical water way, a suitable horizontal disc locking collar 112, 212 may be shaped and sized to fit internally around an inner circumference (i.e., circular cross section) or an inner surface (e.g., elliptical cross section) of a vertical waterway 184, 284 of the firewater monitor system 180, 280. In an embodiment, the horizontal disc locking collar 112, 212 may be ring-shaped.

The vertical disc locking collar 110, 210 may be made of any suitable material. A suitable vertical disc locking collar 110, 210 may be made of any metal. In an embodiment, the vertical locking disc collar 110, 210 may be made of stainless steel.

The horizontal disc locking collar 112, 212 may be made of any suitable material. A suitable horizontal disc locking collar 112, 212 may be made of any metal. In an embodiment, the horizontal locking disc collar 112, 212 may be made of stainless steel.

In an embodiment, the vertical locking disc collar 110, 210 may adapted to be affixed externally around the circumference (i.e., circular cross section) or the outer surface (e.g., elliptical cross section) of the horizontal waterway 182, 282 of the firewater monitor system 180, 280. In an embodiment, the vertical locking disc collar 110, 210 may be affixed to a bottom of a horizontal swivel 186, 286 of the firewater monitor system 180, 280. In an embodiment, the vertical locking disc collar 110, 210 may be affixed to the bottom the horizontal swivel 186, 286 via a fastener or a weld.

Alternatively, when the monitor uses a first slewing drive for the horizontal waterway, the vertical locking disc collar 110, 210 may adapted to be affixed internally around the inner circumference (i.e., circular cross section) or the inner surface (e.g., elliptical cross section) of the horizontal waterway 182, 282 of the firewater monitor system 180, 280. In an embodiment, the vertical locking disc collar 110, 210 may be affixed to a bottom of a horizontal swivel 186, 286 of the firewater monitor system 180, 280. In an embodiment, the vertical locking disc collar 110, 210 may be affixed to the bottom the horizontal swivel 186, 286 via a fastener or a weld.

In an embodiment, the horizontal locking disc collar 112, 212 may be adapted to be affixed externally around the circumference (i.e., circular cross section) or the outer surface (e.g., elliptical cross section) of the vertical waterway 184, 284 of the firewater monitor system 180, 280. In an embodiment, the horizontal locking disc collar 112, 212 may be affixed to a bottom of a vertical swivel 188, 288 of the firewater monitor system 180, 280. In an embodiment, the horizontal locking disc collar 112, 212 may be affixed to the bottom the vertical swivel 188, 288 via a fastener or a weld.

Alternatively, when the monitor uses a second slewing drive for the vertical waterway, the horizontal locking disc collar 112, 212 may be adapted to be affixed internally around the inner circumference (i.e., circular cross section) or the inner surface (e.g., elliptical cross section) of the vertical waterway 184, 284 of the firewater monitor system 180, 280. In an embodiment, the horizontal locking disc collar 112, 212 may be affixed to a bottom of the second slewing drive of the firewater monitor system 180, 280. In an embodiment, the horizontal locking disc collar 112, 212 may be affixed to the bottom the second slewing drive via a fastener or a weld.

Brake Mounts

The vertical brake mount 120, 220 may be any suitable shape and size. A suitable vertical brake mount 120, 220 may be shaped and sized to affix a vertical brake system 130, 230 to a horizontal swivel mounting pad 190, 290 of a firewater monitor system 180 280 such that a portion of the vertical brake system 130, 230 is disposed around a portion of the vertical locking disc collar 110, 210. In an embodiment, the vertical brake mount 120, 220 may be shaped as a curved ring portion extending from a square or rectangular portion.

The horizontal brake mount 122, 222 may be any suitable shape and size. A suitable horizontal brake mount 122, 222 may be shaped and sized to affix a horizontal brake system 140, 240 to a vertical swivel mounting pad 192, 292 of the firewater monitor system 180 280 such that a portion of the horizontal brake system 140, 240 is disposed around a portion of the horizontal locking disc collar 112, 212. In an embodiment, the horizontal brake mount 122, 222 may be shaped as a curved ring portion extending from a square or rectangular portion.

The vertical brake mount 120, 220 may be made of any suitable material. A suitable vertical brake mount 120, 220 may be made of any metal. In an embodiment, the vertical brake mount 120, 220 may be made of stainless steel.

The horizontal brake mount 122, 222 may be made of any suitable material. A suitable horizontal brake mount 122, 222 may be made of any metal. In an embodiment, the horizontal brake mount 122, 222 may be made of stainless steel.

In an embodiment, the vertical brake mount 120, 220 may be adapted to be affixed to a horizontal swivel mounting pad 190, 290 of the firewater monitor system 180, 280. In an embodiment, the vertical brake mount 120, 220 may be affixed to the horizontal swivel mounting pad 190, 290 via a fastener or a weld. In an embodiment, the square or rectangular portion of the vertical brake mount 120, 220 may be affixed to the horizontal swivel mounting pad 190, 290 via a fastener or a weld.

In an embodiment, the horizontal brake mount 122, 222 may be adapted to be affixed to a vertical swivel mounting pad 192, 292 of the firewater monitor system 180, 280. In an embodiment, the horizontal brake mount 122, 222 may be affixed to the vertical swivel mounting pad 192, 292 via a fastener or a weld. In an embodiment, the square or rectangular portion of the horizontal brake mount 122, 222 may be affixed to the vertical swivel mounting pad 192, 292 via a fastener or weld.

Brake System

The vertical brake system 130, 230, 330, 430 may be any suitable brake system. A suitable vertical brake system 130, 230, 330, 430 includes, but is not limited to, a plate-on-plate brake system (e.g., caliper brake system, disc brake system), a meshed-teeth brake system and/or a retracting, locking pin brake system and combinations thereof. In an embodiment, the vertical brake system 130, 230, 330, 430 may be in a fail-safe, resting state such that the vertical brake system 130, 230, 330, 430 may be in an "activated" or closed position, clamping the vertical locking disc collar 110, 210 with sufficient energy to prevent rotational movement of the horizontal waterway 182, 282 of the firewater monitor system 100, 200. In an embodiment, the vertical brake system 130, 230, 330, 430 may be in a "deactivated" or open position, releasing the vertical locking disc collar 110, 210 to allow rotational movement of the horizontal waterway 182, 282 of the firewater monitor system 100, 200.

Figure 3B:
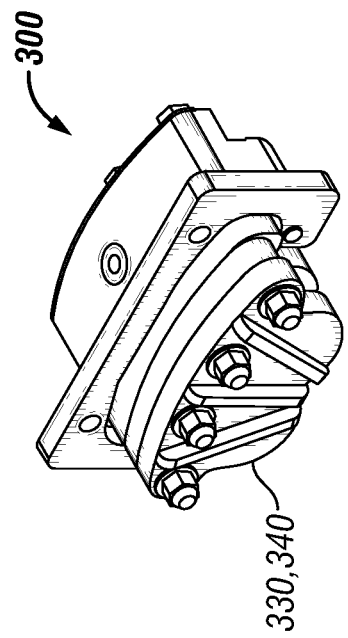
FIG. 3B is s bottom, right perspective view of the exemplary disc brake system of FIG. 3A.
Figure 3D:
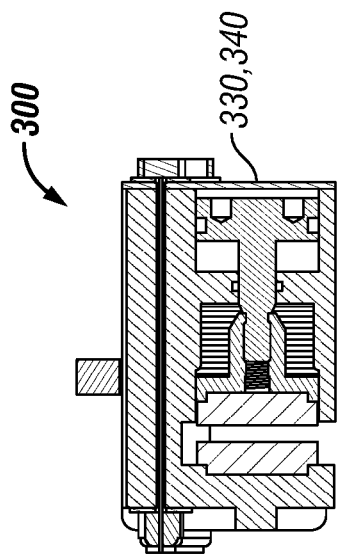
FIG. 3D is a detail A-A view of the exemplary disc brake system of FIG. 3C.
Figure 3A:
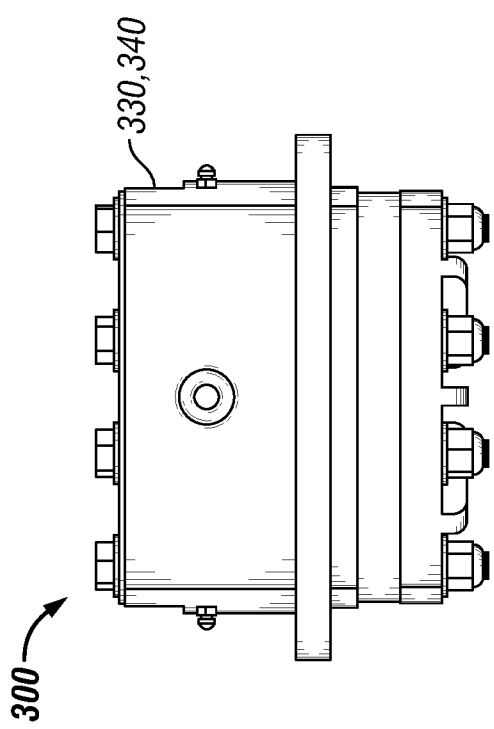
FIG. 3A is a front view of an exemplary disc brake system of the firewater monitor brake system according to an embodiment of the present invention.
Figure 3C:
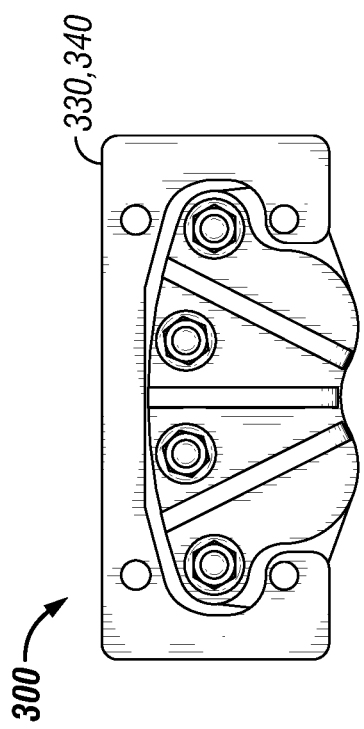
FIG. 3C is a bottom view of the exemplary disc brake system of FIGS. 3A-3B.

For example, a suitable vertical brake system 130, 230, 330, 430 is available from W.C. Branham Inc. In an embodiment, the vertical brake system 130, 230, 330 may be a FS200 Series Disc Brake System from W.C. Branham Inc. or equivalent. FIG. 3A illustrates front view of an exemplary disc brake system 300 of the firewater monitor brake system 100, 200 according to an embodiment; FIG. 3B illustrates bottom, right perspective view of the exemplary disc brake system 300 of FIG. 3A; FIG. 3C illustrates bottom view of the exemplary disc brake system 300 of FIGS. 3A-3B; and FIG. 3D illustrates a detail A-A view of the exemplary disc brake system 300 of FIG. 3C.

Figure 4A:
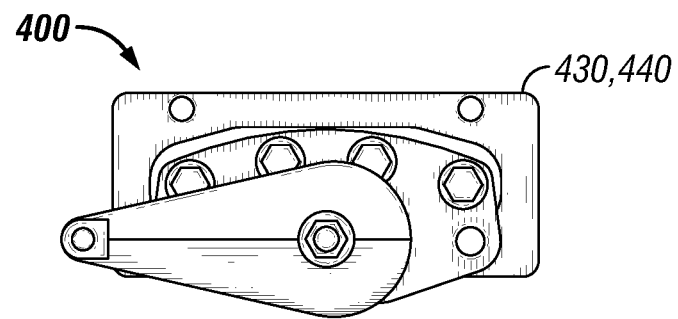
FIG. 4A is a top view of an exemplary caliper brake system of the firewater monitor brake system according to an embodiment of the present invention.
Figure 4B:
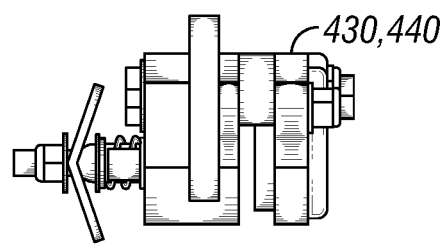
FIG. 4B is a right, side view of the exemplary caliper brake system of FIG. 4A.
Figure 4C:
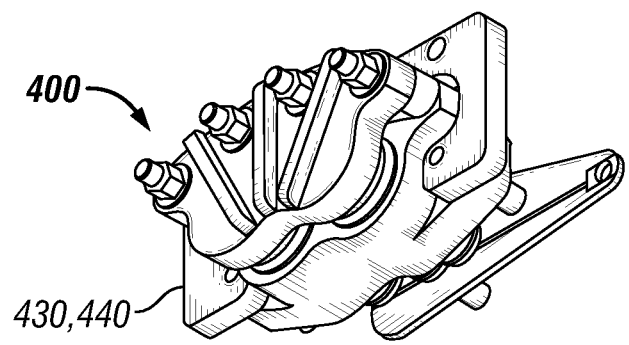
FIG. 4C is a bottom, left perspective view of the exemplary caliper brake system of FIGS. 4A-4B.

In an embodiment, the vertical brake system 130, 230, 430 may be a M200 Series Caliper Brake System from W.C. Branham Inc. or equivalent. FIG. 4A illustrates top view of an exemplary caliper brake system 400 of the firewater monitor brake system 100, 200 according to an embodiment of the present invention; FIG. 4B illustrates right, side view of the exemplary caliper brake system 400 of FIG. 4A; and FIG. 4C illustrates bottom, left perspective view of the exemplary caliper brake system 400 of FIGS. 4A-4B.

In an embodiment, the vertical brake system 130, 230 may be a meshed-teeth brake system such that a plurality of teeth on a brake plate and a plurality of like-shaped and like-sized teeth are machined into a vertical locking disc collar 110, 210.

In an embodiment, the vertical brake system 130, 230 may be a retractable, locking pin brake system such that the retracting, locking pin may be held in an unengaged position and that, when engaged the retracting, locking pin may drop into a hole machined in the vertical locking disc collar 110, 210.

The horizontal brake system 140, 240, 340, 440 may be any suitable brake system. A suitable horizontal brake system 140, 240, 340, 440 includes, but is not limited to, a plate-on-plate brake system (e.g., caliper brake system, disc brake system), a meshed-teeth brake system and/or a retracting, locking pin brake system and combinations thereof. In an embodiment, the horizontal brake system 140, 240, 340, 440 may be in a fail-safe, resting state such that the horizontal brake system 140, 240, 340, 440 may be in an "activated" or closed position, clamping the horizontal locking disc collar 112, 212 with sufficient energy to prevent rotational movement of the vertical waterway 184, 284 of the firewater monitor system 100, 200. In an embodiment, the horizontal brake system 140, 240, 340, 440 may be in a "deactivated" or open position, releasing the horizontal locking disc collar 112, 212 to allow rotational movement of the vertical waterway 184, 284 of the firewater monitor system 100, 200.

For example, a suitable horizontal brake system 140, 240, 340, 440 is available from W.C. Branham Inc. In an embodiment, the horizontal brake system 140, 240, 340 may be a FS200 Series Disc Brake System from W.C. Branham Inc. or equivalent. See also FIGS. 3A-3D. In an embodiment, the horizontal brake system 140, 240, 440 may be a M200 Series Caliper Brake System from W.C. Branham Inc. or equivalent. See also FIGS. 4A-4C.

In an embodiment, the horizontal brake system 140, 240 may be a meshed-teeth brake system such that a plurality of teeth on a brake plate and a plurality of like-shaped and like-sized teeth are machined into a horizontal locking disc collar 112, 212.

In an embodiment, the horizontal brake system 140, 240 may be a retractable, locking pin brake system such that the retracting, locking pin may be held in an unengaged position and that, when engaged the retracting, locking pin may drop into a hole machined in the horizontal locking disc collar 112, 212.

In an embodiment, a vertical brake system 130, 230, 330, 430 is affixed to the vertical brake mount 120, 220 via a fastener or weld such that a portion of the vertical brake system 130, 230, 330, 430 is disposed around a portion of the vertical locking disc collar 110, 210. In an embodiment, a vertical brake system 130, 230, 330, 430 is affixed to the ring portion of the vertical brake mount 120, 220 via a fastener or weld.

In an embodiment, a horizontal brake system 140, 240, 340, 440 is affixed to the horizontal brake mount 122, 222 via a fastener or weld such that a portion of the horizontal brake system 140, 240, 340, 440 is disposed around a portion of the horizontal locking disc collar 112, 212. In an embodiment, a horizontal brake system 140, 240, 340, 440 is affixed to the ring portion of the horizontal brake mount 122, 222 via a fastener or weld.

Master Cylinders

The master cylinder 150, 250, 750, 850 may be any suitable master cylinder. A suitable master cylinder 150, 250, 750, 850 includes, but is not limited to, a hydraulic master cylinder (see FIGS. 7-8), and a radial master cylinder (see FIGS. 1F, 2A-2F & 5). For example, a suitable master cylinder 150, 250 is available from Brembo SpA. In an embodiment, the master cylinder 150, 250 may be a Radial Master Cylinder from Brembo SpA or equivalent.

The vertical master cylinder 152, 252, 552, 752, 852 may be any suitable master cylinder. A suitable vertical master cylinder 152, 252, 552, 752, 852 includes, but is not limited to, a hydraulic master cylinder (see FIGS. 7-8), and a radial master cylinder (see FIGS. 1F, 2A-2F & 5). For example, a suitable vertical master cylinder 152, 252, 552 is available from Brembo SpA. In an embodiment, the vertical master cylinder 152, 252, 552 may be a Radial Master Cylinder from Brembo SpA or equivalent.

The horizontal master cylinder 154, 254, 554, 754, 854 may be any suitable master cylinder. A suitable horizontal master cylinder 154, 254, 554, 754, 854 includes, but is not limited to, a hydraulic master cylinder (see FIGS. 7-8), and a radial master cylinder (see FIGS. 1F, 2A-2F & 5). For example, a suitable horizontal master cylinder 154, 254, 554 is available from Brembo SpA. In an embodiment, the horizontal master cylinder 154, 254, 553 may be a Radial Master Cylinder from Brembo SpA or equivalent.

Lever System

Figure 5:
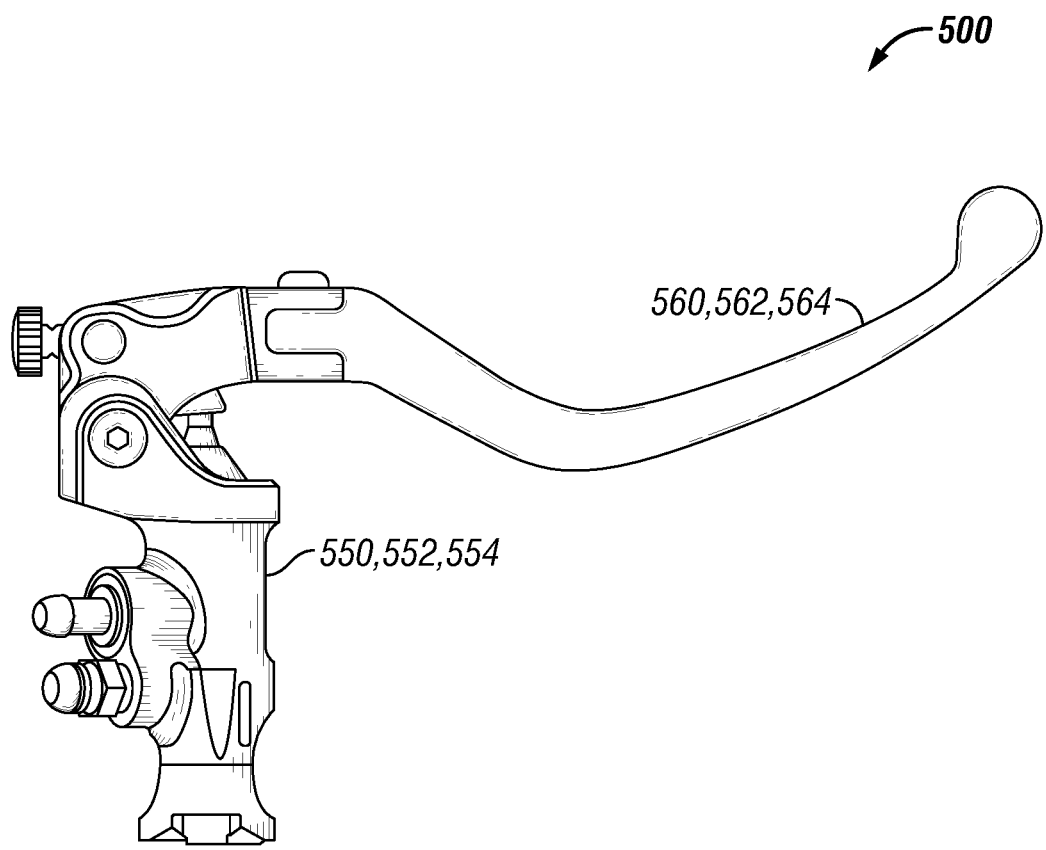
FIG. 5 is a side view of an exemplary radial master cylinder having a lever system of the firewater monitor brake system according to an embodiment of the present invention.

FIG. 1F is a detail view of an exemplary lever system for the firewater monitor brake system of FIGS. 1A-1E; and FIG. 5 is a side view of an exemplary radial master cylinder having a lever system of the firewater monitor brake system.

Figure 7A:
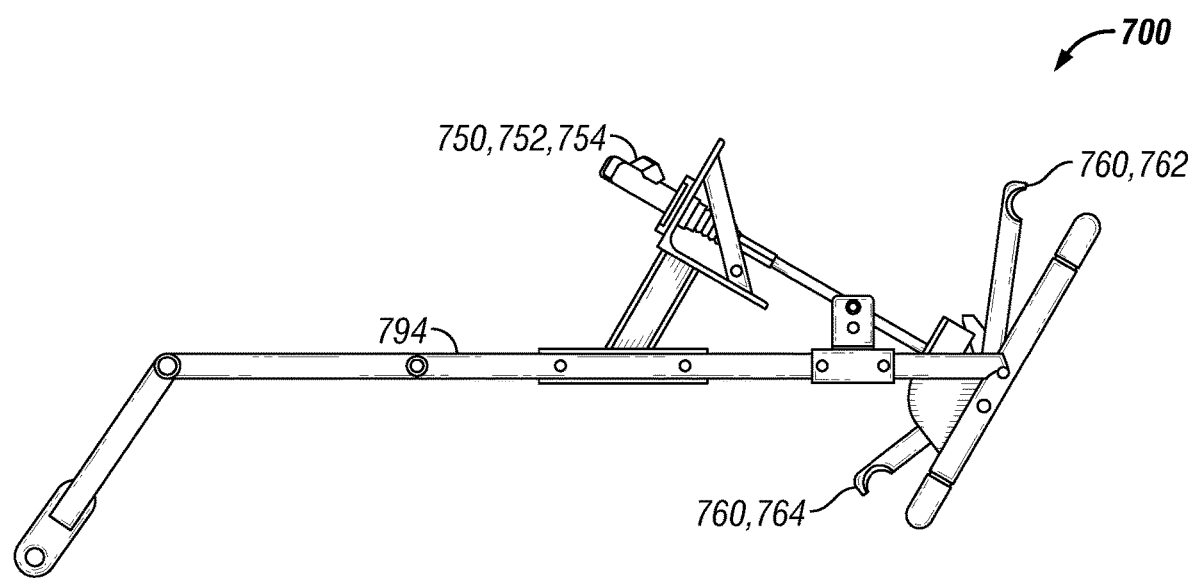
FIG. 7A is a side view of another exemplary lever system for the firewater monitor brake system according to an embodiment of the present invention, showing the lever system in a disengaged position.
Figure 7B:
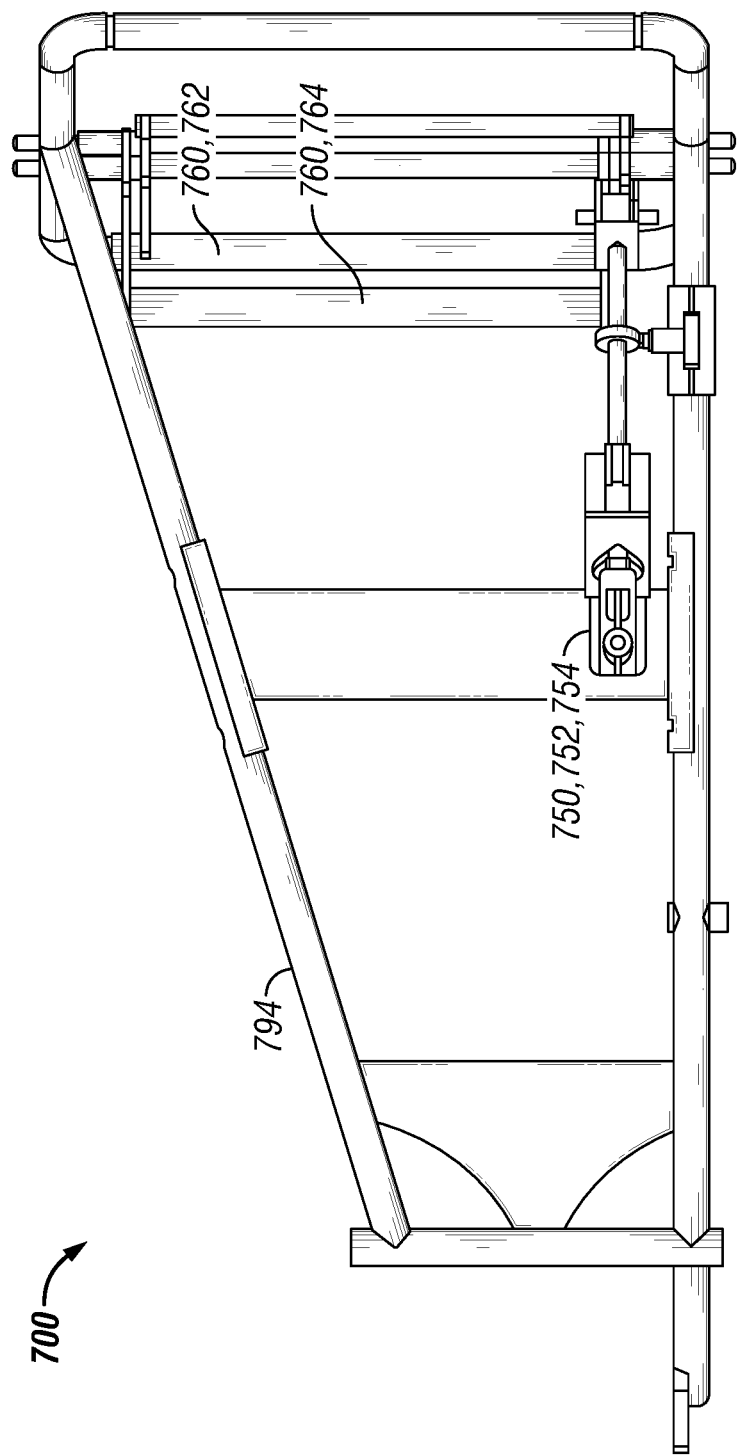
FIG. 7B is a top view of the exemplary lever system of FIG. 7A, showing the lever system in a disengaged position.

FIG. 7A is a side view of another exemplary lever system for the firewater monitor brake system according to an embodiment of the present invention; FIG. 7B is a top view of the exemplary lever system of FIG. 7A; and FIG. 7C is a front view of the exemplary lever system of FIGS. 7A-7B, showing the lever system in an disengaged position.

Figure 7C:
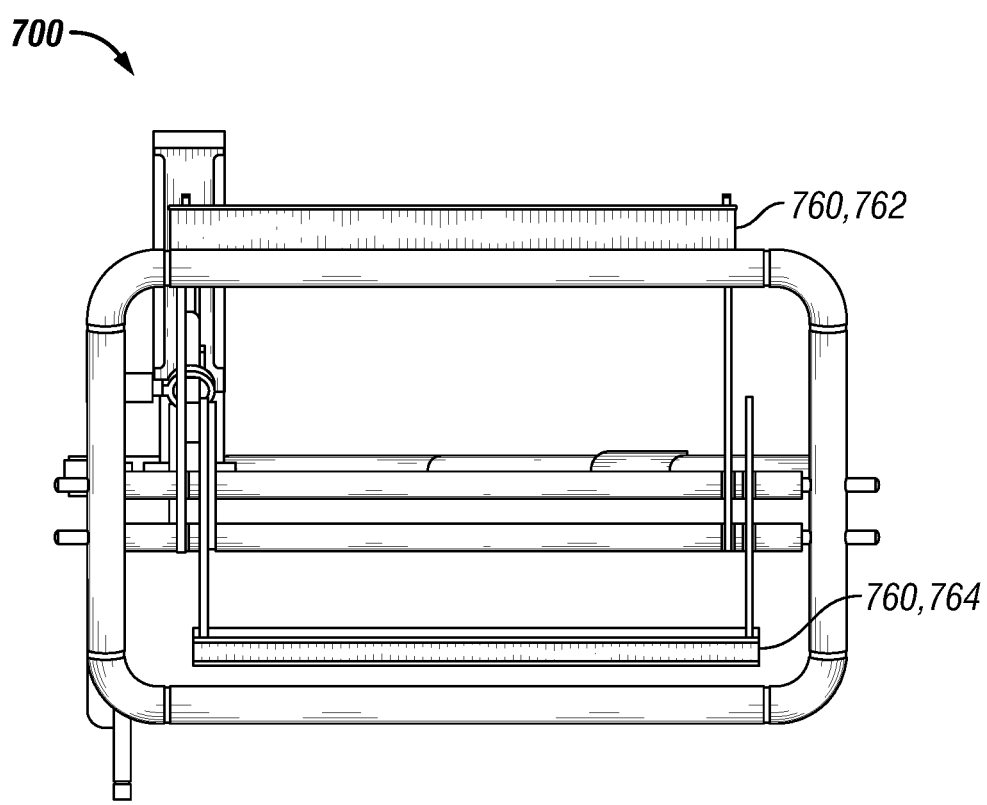
FIG. 7C is a front view of the exemplary lever system of FIGS. 7A-7B, showing the lever system in the disengaged position.
Figure 8A:
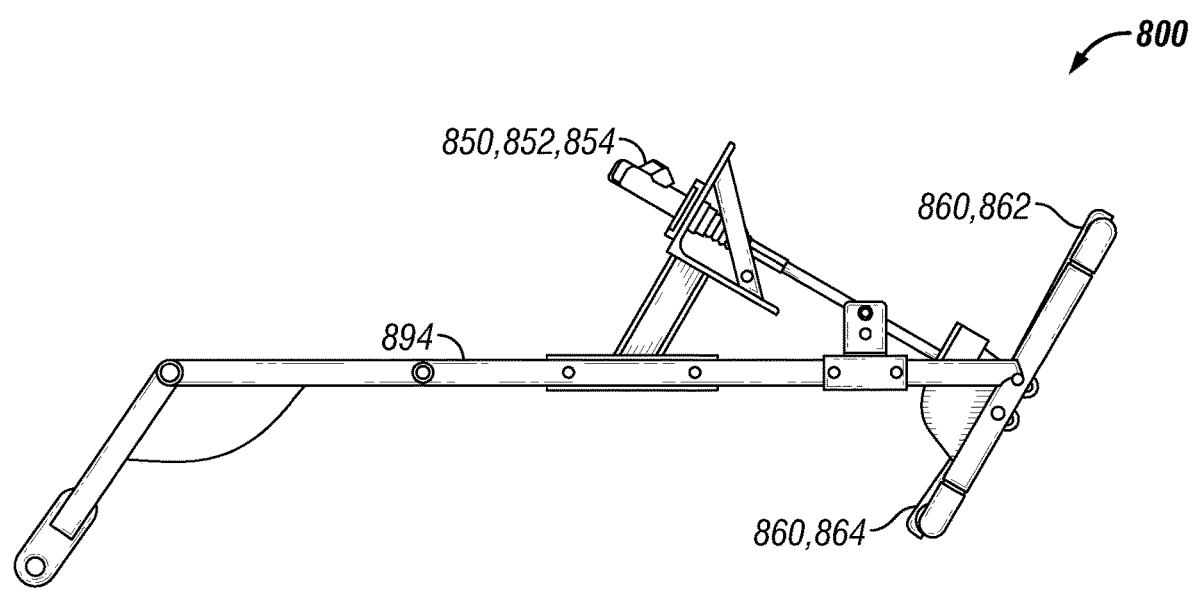
FIG. 8A is a side view of the exemplary lever system of FIGS. 7A-7C, showing the lever system in an engaged position.
Figure 8C:
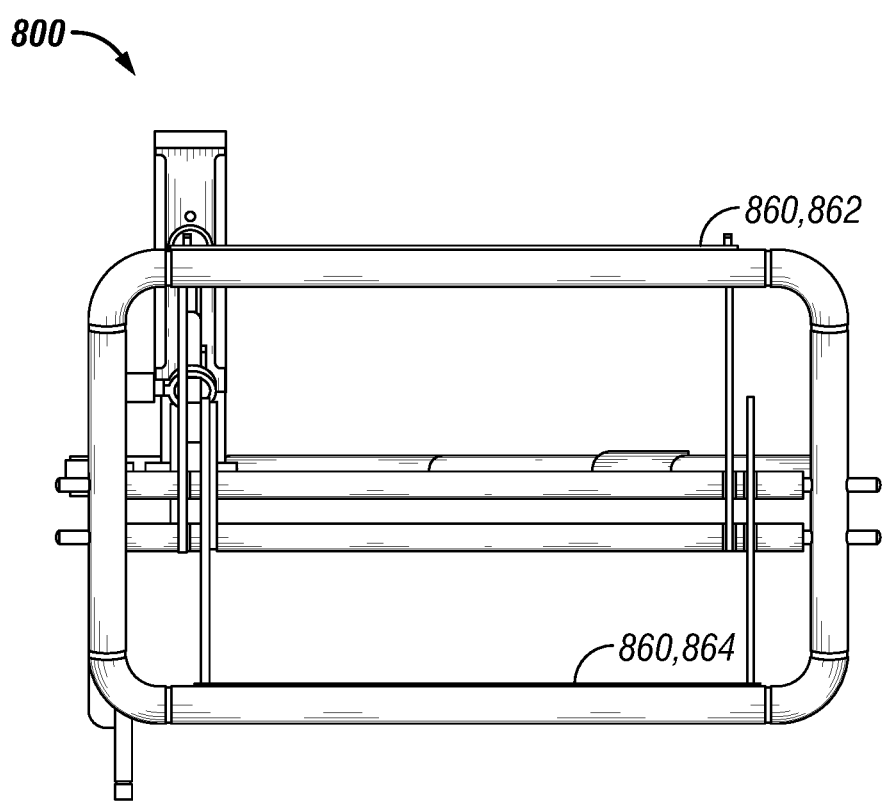
FIG. 8C is a front view of the exemplary lever system of FIGS. 7A-7C and 8A-8B, showing the lever system in the engaged position.

FIG. 8A is a side view of the exemplary lever system of FIGS. 7A-7C; FIG. 8B is a top view of the exemplary lever system of FIGS. 7A-7C and 8A; and FIG. 8C is a front view of the exemplary lever system of FIGS. 7A-7C and 8A-8B, showing the lever system in an engaged position.

Figure 9:
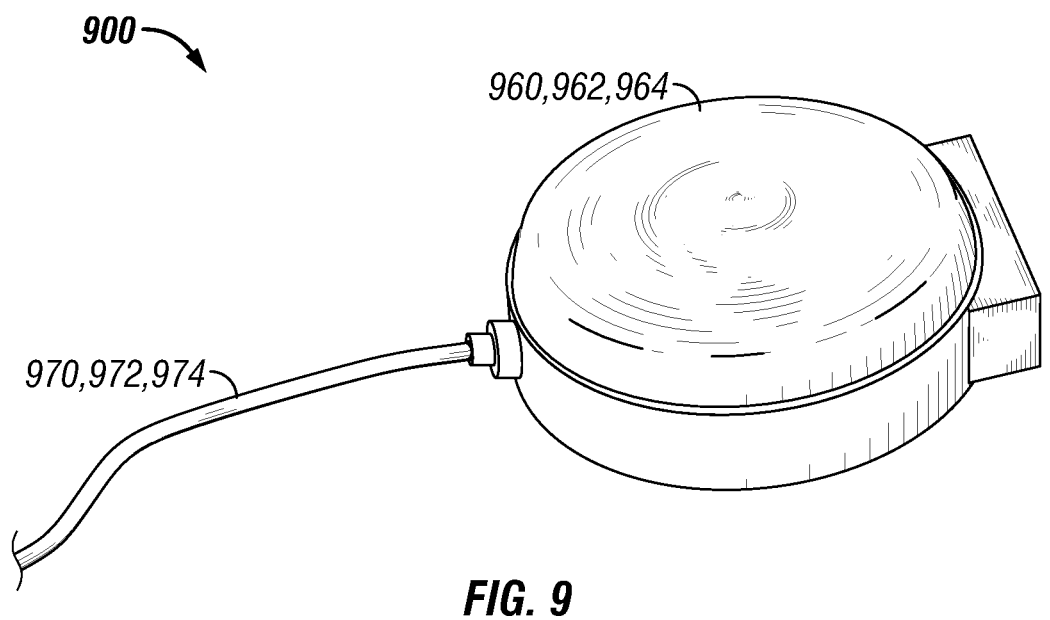
FIG. 9 illustrates an upper, side perspective view of another exemplary lever system of the firewater monitor brake system according to an embodiment of the present invention, showing a foot operated lever system in a disengaged position.

FIG. 9 illustrates an upper, side perspective view of another exemplary lever system of the firewater monitor brake system according to an embodiment of the present invention, showing a foot operated lever system in a disengaged position.

In an embodiment, the lever system 160, 260, 560, 760, 860 may be a hand operated lever system; and a lever system 960 may be a foot operated lever system. See FIGS. 1A, 1F-1G, 2A-2F, 5 & 7A-9.

The lever system 160, 260, 760, 860 may be any suitable lever system. A suitable lever system 160, 260, 760, 860 includes, but is not limited to, a caliper-style lever system (see FIGS. FIGS. 1A, 1F-1G, 2A-2F & 5), a side-to-side handle-style (e.g., lawn mower lever) lever system (see FIGS. 7A-8C), a top-to-bottom-style lever system and combinations thereof.

For example, a suitable caliper-style lever system 160, 260 is available from Brembo SpA. In an embodiment, the lever system 160, 260 may be part of a Radial Master Cylinder from Brembo SpA.

The lever system 960 may be any suitable lever system. A suitable lever system 960 includes, but is not limited to, a button-style (e.g., anchor windlass) lever system (see FIG. 9), a pedal-style (e.g., sewing machine pedal) lever system and combinations thereof.

The vertical lever system 162, 262, 562, 762, 862 may be any suitable lever system. A suitable vertical lever system 162, 262, 562, 762, 862 includes, but is not limited to, a caliper-style lever system (see FIGS. 1A, 1F-1G, 2A-2F & 5), a side-to-side handle-style (e.g., lawn mower lever) lever system (see FIGS. 7A-8C), a top-to-bottom-style lever system and combinations thereof.

For example, a suitable caliper-style vertical lever system 162, 262, 562 is available from Brembo SpA. In an embodiment, the vertical lever system 162, 262, 562 may be part of a Radial Master Cylinder from Brembo SpA.

The vertical lever system 962 may be any suitable lever system. A suitable vertical lever system 962 includes, but is not limited to, a button-style (e.g., anchor windlass) lever system (see FIG. 9), a pedal-style (e.g., sewing machine pedal) lever system and combinations thereof.

The horizontal lever system 164, 264, 564, 764, 864 may be any suitable lever system. A suitable horizontal lever system 164, 264, 564, 764, 864 includes, but is not limited to, a caliper-style lever system (see FIGS. 1A, 1F-1G, 2A-2F & 5), a side-to-side handle-style (e.g., lawn mower lever) lever system (see FIGS. 7A-8C), a top-to-bottom-style lever system and combinations thereof.

For example, a suitable caliper-style horizontal lever system 164, 264, 564 is available from Brembo SpA. In an embodiment, the horizontal lever system 164, 264, 564 may be part of a Radial Master Cylinder from Brembo SpA.

The horizontal lever system 964 may be any suitable lever system. A suitable horizontal lever system 964 includes, but is not limited to, a button-style (e.g., anchor windlass) lever system (see FIG. 9), a pedal-style (e.g., sewing machine pedal) lever system and combinations thereof.

In an embodiment, the lever system 160, 260, 760, 860 may be adapted to be affixed to a tiller bar 194, 294, 794, 894 of the firewater monitor system 180, 280.

In an embodiment, the vertical lever system 162, 262, 762, 862 may be adapted to be affixed to a tiller bar 194, 294, 794, 894 of the firewater monitor system 180, 280.

In an embodiment, the horizontal lever system 164, 264, 764, 864 may be adapted to be affixed to a tiller bar 194, 294, 794, 894 of the firewater monitor system 180, 280.

In an embodiment, the lever system 160, 260, 760, 860, 960 may be fluidly (i.e., hydraulic, pneumatic) connected to and/or mechanically (e.g., cable linkage) coupled to the master cylinder 150, 250, 750, 850 via an actuation system 170, 270, 970.

In an embodiment, the vertical lever system 162, 262, 762, 862, 962 may be fluidly (i.e., hydraulic, pneumatic) connected to and/or mechanically (e.g., cable linkage) coupled to the vertical master cylinder 152, 252, 752, 852 via a vertical actuation system 172, 272, 972.

In an embodiment, the horizontal lever system 164, 264, 764, 864, 964 may be fluidly (i.e., hydraulic, pneumatic) connected to and/or mechanically (e.g., cable linkage) coupled to the horizontal master cylinder 154, 254, 754, 854 via the horizontal actuation system 174, 274, 974.

In an embodiment, the master cylinder 150, 250, 750, 850 may be fluidly (i.e., hydraulic, pneumatic) connected to and/or mechanically (e.g., cable linkage) coupled to the vertical brake system 130, 230 and/or the horizontal brake system 140, 240 via the actuation system 170, 270, 970.

In an embodiment, the vertical master cylinder 152, 252, 752, 754 may be fluidly (i.e., hydraulic, pneumatic) connected to and/or mechanically (e.g., cable linkage) coupled to the vertical brake system 130, 230 via the vertical actuation system 172, 272, 972.

In an embodiment, the horizontal master cylinder 154, 254, 754, 854 may be fluidly (i.e., hydraulic, pneumatic) connected to and/or mechanically (e.g., cable linkage) coupled to the horizontal brake system 140, 240 via the horizontal actuation system 174, 274, 974.

Actuation System

The actuation system 170, 270, 970 may be any suitable actuation system. A suitable actuation system 170, 270, 970 includes, but is not limited to, cable linkage systems, hydraulic systems (see FIGS. 1A, 1D-1F & 9), and pneumatic systems.

The vertical actuation system 172, 272, 972 may be any suitable actuation system. A suitable vertical actuation system 172, 272, 972 includes, but is not limited to, cable linkage systems, hydraulic systems (see FIGS. 1A, 1D-1F & 9), and pneumatic systems.

The horizontal actuation system 174, 274, 974 may be any suitable actuation system. A suitable horizontal actuation system 174, 274, 974 includes, but is not limited to, cable linkage systems, hydraulic systems (see FIGS. 1A, 1D-1F & 9), and pneumatic systems.

Method of Using Firewater Monitor Brake System

Figure 6A:
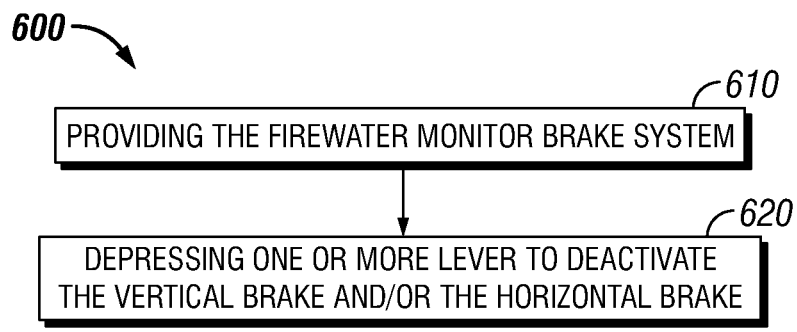
FIG. 6A is a flow chart of an exemplary method of using the firewater monitor brake system of FIGS. 1A-5 according to an embodiment of the present invention.
Figure 6B:
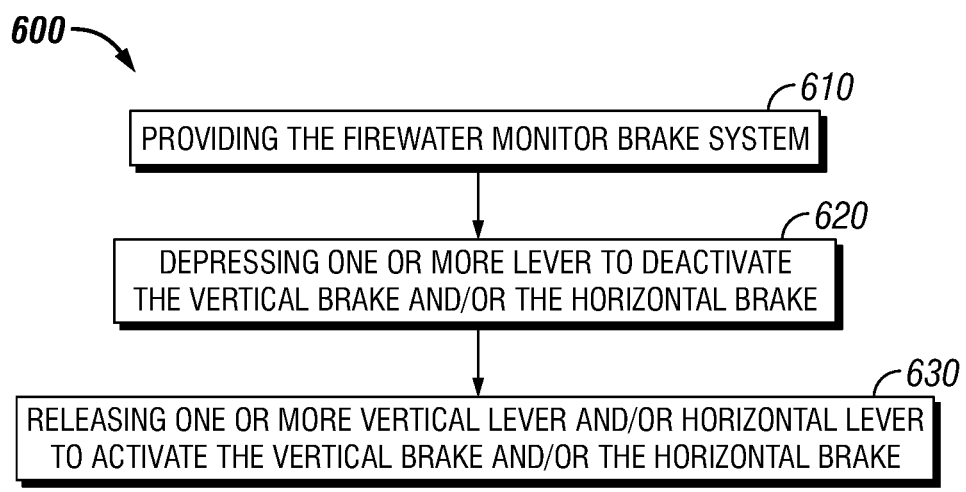
FIG. 6B is a flow chart of another exemplary method of using the firewater monitor brake system of FIGS. 1A-5.
Figure 6C:
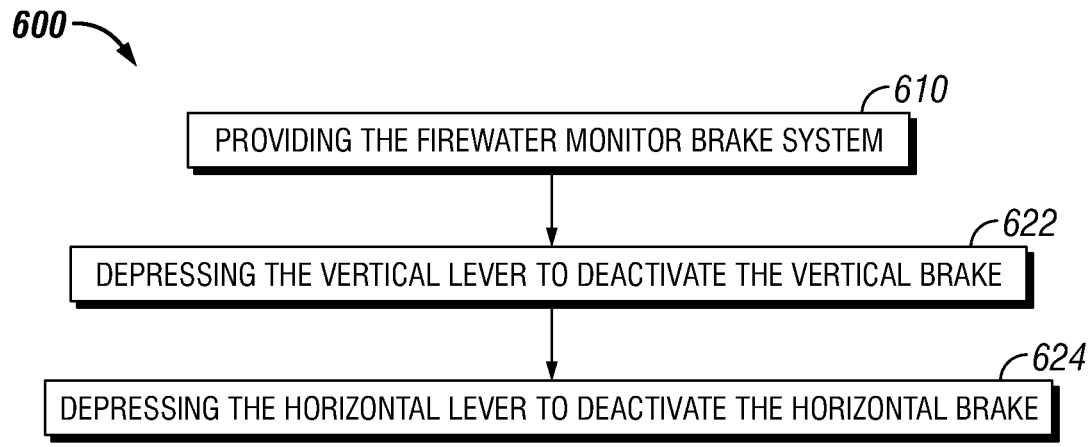
FIG. 6C is a flow chart of another exemplary method of the using the firewater brake system of FIGS. 1A-5.
Figure 6D:
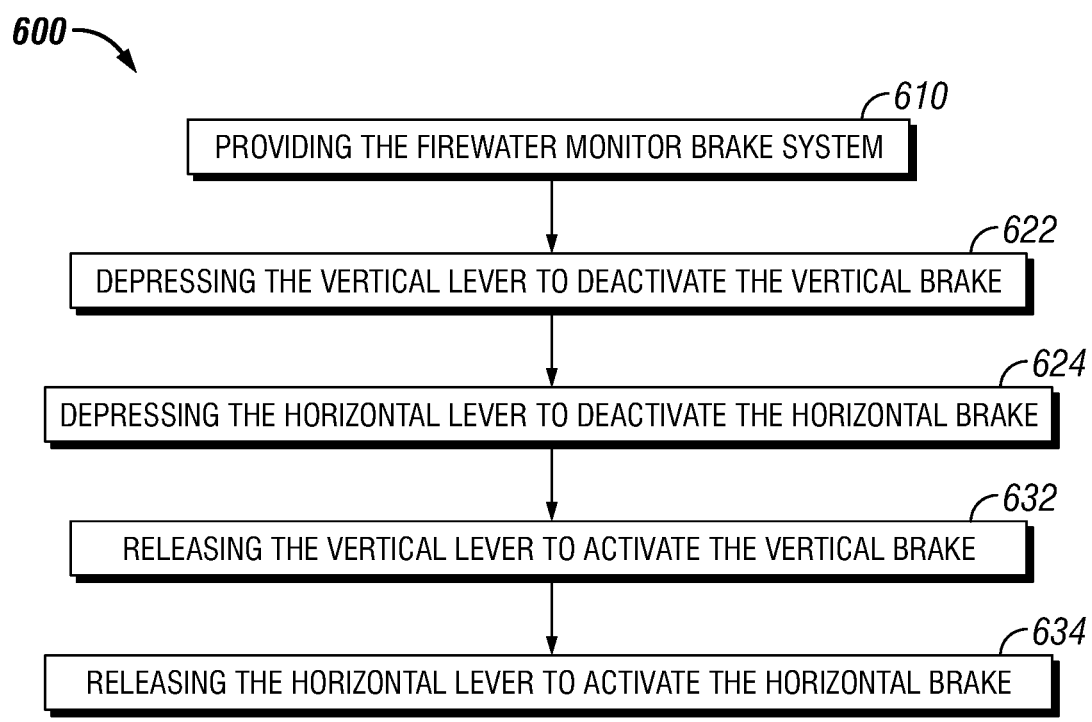
FIG. 6D is a flow chart of another exemplary method of the using the firewater brake system of FIGS. 1A-5.

FIG. 6A illustrates a flow chart of an exemplary method of using the firewater monitor brake system 600 of FIGS. 1A-5 according to an embodiment of the present invention; FIG. 6B illustrates a flow chart of another exemplary method of using the firewater monitor brake system 600 of FIGS. 1A-5; FIG. 6C illustrates a flow chart of another exemplary method of the using the firewater brake system 600 of FIGS. 1A-5; and FIG. 6D illustrates a flow chart of another exemplary method of the using the firewater brake system 600 of FIGS. 1A-5.

In an embodiment, the method of using a firewater monitor brake system 600 comprises:

a) providing the firewater monitor brake system 610, as discussed above; and b) depressing one or more lever to deactivate the vertical brake and/or the horizontal brake 620. See FIG. 6A. In an embodiment, the method comprises b) depressing a vertical lever to deactivate the vertical brake 622. See FIGS. 6C-6D. In an embodiment, the method comprises b) depressing a horizontal lever to deactivate the horizontal brake 624. Id.

In an embodiment, the method 600 further comprises:

c) releasing one or more lever to activate the vertical brake and/or the horizontal brake 630. See FIG. 6B. In an embodiment, the method 600 comprises c) releasing the vertical lever to activate the vertical brake 632. See FIG. 6D. In an embodiment, the method 600 comprises c) releasing the horizontal lever to activate the horizontal brake 634. Id.

In an embodiment, the method of using a firewater monitor brake system 600 comprises:

a) providing the firewater monitor brake system 610, as discussed above; and b) depressing one or more vertical lever and/or horizontal lever to deactivate the vertical brake and/or the horizontal brake 620. See FIG. 6A. In an embodiment, the method comprises b) depressing the vertical lever to deactivate the vertical brake 622. See FIG. 6C-6D. In an embodiment, the method comprises b) depressing the horizontal lever to deactivate the horizontal brake 624. Id.

In an embodiment, the method 600 further comprises:

c) releasing one or more vertical lever and/or horizontal lever to activate the vertical brake and/or the horizontal brake 630. See FIG. 6B. In an embodiment, the method 600 comprises c) releasing the vertical lever to activate the vertical brake 632. See FIG. 6D. In an embodiment, the method 600 comprises c) releasing the horizontal lever to activate the horizontal brake 634. Id.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims. The invention is specifically intended to be as broad as the claims below and their equivalents.

Definitions

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

It is important to note that the construction and arrangement of the firewater brake system is shown in the various exemplary embodiments is illustrative only. Additionally, any element disclosed in one embodiment may be incorporated or utilized with any other embodiment disclosed herein

INCORPORATION BY REFERENCE

All patents and patent applications, articles, reports, and other documents cited herein are fully incorporated by reference to the extent they are not inconsistent with this invention.

What is claimed is:

1. A firewater monitor brake system, comprising:
 a) a vertical locking disc collar adapted to be affixed externally or internally to a horizontal swivel of a firewater monitor system;
 b) a horizontal locking disc collar adapted to be affixed externally or internally to a vertical swivel of the firewater monitor system;

c) a vertical brake mount adapted to be affixed to a horizontal swivel mounting pad of the firewater monitor system;
d) a horizontal brake mount adapted to be affixed to a vertical swivel mounting pad of the firewater monitor system;
e) a vertical brake system; wherein the vertical brake system is affixed to the vertical brake mount such that a portion of the vertical brake system is disposed around a portion of the vertical locking disc collar;
f) a horizontal brake system, wherein the horizontal brake system is affixed to the horizontal brake mount such that a portion of the horizontal brake system is disposed around a portion of the horizontal locking disc collar; and
g) a master cylinder adapted to be affixed to a tiller bar of the firewater monitor system, wherein the master cylinder is connected to and/or coupled to a lever system and wherein the master cylinder is connected to and or coupled to the vertical brake system and/or the horizontal brake system via an actuation system.

2. The system of claim 1, wherein the vertical brake system is a plate-on-plate brake system.

3. The system of claim 1, wherein the horizontal brake system is a plate-on-plate brake system.

4. The system of claim 1, wherein one or more of the vertical brake system and the horizontal brake system is a caliper brake system.

5. The system of claim 1, wherein one or more of the vertical brake system and the horizontal brake system is a disc brake system.

6. The system of claim 1, wherein one or more of the vertical brake system and the horizontal brake system is capable of an activated, closed position, clamping the vertical locking disc collar and/or the horizontal locking collar with sufficient energy to prevent rotational movement of a horizontal waterway and/or a vertical waterway of the firewater monitor system.

7. The system of claim 1, wherein one or more of the vertical brake system and the horizontal brake system is capable of a deactivated, open position, releasing the vertical locking disc collar and/or the horizontal locking collar to allow rotational movement of a horizontal waterway and/or a vertical waterway of the firewater monitor system.

8. The system of claim 1, wherein the master cylinder is a radial master cylinder.

9. The system of claim 1, wherein the actuation system is a hydraulic systems.

* * * * *